(12) United States Patent
Yasugi (10) Patent No.: US 8,610,299 B2
(45) Date of Patent: Dec. 17, 2013

(54) WIND TURBINE CONTROL DEVICE AND METHOD FOR REDUCING FLUCTUATION OF GRID FREQUENCY WHEN GRID DISTURBANCE OCCURS, AND WIND TURBINE GENERATOR SYSTEM THEREOF

(75) Inventor: Akira Yasugi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/474,036

(22) Filed: May 17, 2012

(65) Prior Publication Data

US 2013/0221669 A1     Aug. 29, 2013

Related U.S. Application Data

(63) Continuation of application No. PCT/JP2012/054654, filed on Feb. 24, 2012.

(51) Int. Cl.
*H02P 9/04*     (2006.01)

(52) U.S. Cl.
USPC .............................................. 290/44; 322/44

(58) Field of Classification Search
None
See application file for complete search history.

(56) References Cited

U.S. PATENT DOCUMENTS

| | | | |
|---|---|---|---|
| 2009/0167021 A1* | 7/2009 | Andersen ........................ | 290/44 |
| 2009/0261589 A1 | 10/2009 | Oohara et al. | |
| 2010/0066086 A1* | 3/2010 | Ko et al. ........................ | 290/44 |
| 2010/0148507 A1 | 6/2010 | Lim et al. | |
| 2011/0031748 A1 | 2/2011 | Arinaga et al. | |
| 2011/0187106 A1* | 8/2011 | Ichinose et al. ................. | 290/44 |
| 2011/0309804 A1* | 12/2011 | Yasugi ............................ | 322/19 |

FOREIGN PATENT DOCUMENTS

| | | | |
|---|---|---|---|
| CN | 101793227 A | 8/2010 | |
| JP | 2001-234845 A | 8/2001 | |
| JP | 2009-303355 A | 12/2009 | |
| JP | 4782245 B1 | 7/2011 | |
| JP | 4848478 B1 | 12/2011 | |
| WO | WO 2011/158351 A1 | 12/2011 | |

OTHER PUBLICATIONS

State Intellectual Property Office of the People's Republic of China, "Office Action for CN 201280001239.X", May 30, 2013, Engl. Trans. only.
Japan Patent Office, "Decision to Grant a Patent for JP 2012-556731", Jun. 25, 2013.

* cited by examiner

*Primary Examiner* — Tulsidas C Patel
*Assistant Examiner* — S. Mikailoff
(74) *Attorney, Agent, or Firm* — Manabu Kanesaka; Kenneth M. Berner; Benjamin J. Hauptman (57) ABSTRACT

When a grid disturbance occurs, output power control is performed for each wind turbine so as to reduce fluctuation of a frequency of an output power of the wind turbine at an early stage of the grid disturbance. The output power control is performed for each wind turbine so as to reduce fluctuation of a grid frequency at an interconnection point, in a late stage of the grid disturbance.

7 Claims, 7 Drawing Sheets

WIND TURBINE CONTROL DEVICE AND METHOD FOR REDUCING FLUCTUATION OF GRID FREQUENCY WHEN GRID DISTURBANCE OCCURS, AND WIND TURBINE GENERATOR SYSTEM THEREOF

CROSS REFERENCE TO RELATED APPLICATIONS

This is a continuation of International Application PCT/JP2012/054654, with an international filing date of Feb. 24, 2012, which is hereby incorporated by reference herein in its entirety.

BACKGROUND OF THE INVENTION

1. Field of the Invention

The present invention relates to a wind turbine control device, a method therefor, and a wind turbine generator system.

2. Description of the Related Art

For example, if the power supply capacity for a wind turbine is reduced due to tripping of a generator or a grid failure, a grid disturbance (fluctuation of a grid frequency) occurs. As a wind-turbine control method used at the time of such a grid disturbance, for example, the Publication of Japanese Patent No. 4782245 discloses a method for controlling the active power of a wind turbine so as to reduce the grid disturbance, based on conversion information indicating the preset relationship between fluctuation of a grid frequency and an active power command value.

BRIEF SUMMARY OF THE INVENTION

In recent years, the scale of the power generation through a wind turbine generator has been increased. Thus, when a grid disturbance occurs, the control to promptly reduce the grid disturbance is effective.

The present invention provides a wind turbine control device, a method therefor, and a wind turbine generator system in which, when a grid disturbance occurs, a fluctuation of grid frequency can be promptly reduced.

According to a first aspect, the present invention provides a wind turbine control device applied to a wind turbine generator system in which output powers of a plurality of wind turbines are supplied to a utility grid through a common interconnection point, the wind turbine control device being provided in each of the wind turbines. The wind turbine control device includes a setting section for generating first command information used to generate a first output power command for reducing fluctuation of a grid frequency at the interconnection point when the grid disturbance occurs; a processing section for generating second command information used to generate a second output power command for reducing fluctuation of a frequency of the output power of the corresponding wind turbine when the grid disturbance occurs; a selection section for selecting the first command information or the second command information when a grid disturbance occurs; and a command generating section for generating the first output power command or the second output power command based on the command information selected by the selection section.

According to a second aspect, the present invention provides a control method for each of a plurality of wind turbines, the method being applied to a wind turbine generator system in which output powers of the plurality of wind turbines are supplied to a utility grid through a common interconnection point. The method includes a setting step of setting first command information used to generate an output power command for reducing fluctuation of a grid frequency at the interconnection point when the grid disturbance occurs; a processing step of setting second command information used to generate an output power command for reducing fluctuation of a frequency of the output power of the corresponding wind turbine when the grid disturbance occurs; a selecting step of selecting the first command information or the second command information, when a grid disturbance occurs; and a command generating step of generating the first output power command or the second output power command based on the command information selected in the selecting step.

According to a third aspect, the present invention provides a wind turbine generator system equipped with a plurality of wind turbines, in which output powers of the plurality of wind turbines are supplied to a utility grid through a common interconnection point. The wind turbine generator system includes a central control system for controlling output power at the interconnection point, and a plurality of wind turbine control devices each of which is provided in each of the wind turbines, for controlling output power of the corresponding wind turbine; the central control system includes a first processing section for generating first command information used to generate output power commands for reducing fluctuation of a grid frequency at the interconnection point when the grid disturbance occurs, and a transmission section for sending the first command information for the wind turbines generated by the first processing section to the wind turbines; and each of the wind turbine control devices includes a reception section for receiving the first command information from the central control system, a setting section for transmitting the first command information; a second processing section for generating second command information used to generate an output power command for reducing fluctuation of a frequency of the output power of the corresponding wind turbine; a selection section for selecting the first command information or the second command information when a grid disturbance occurs; and a command generating section for generating the first output power command or the second output power command based on the command information selected by the selection section.

According to the present invention, an advantage is afforded in that, when a grid disturbance occurs, a frequency change can be promptly reduced.

DETAILED DESCRIPTION OF THE INVENTION

A wind turbine control device, a method therefor, and a wind turbine generator system according to one embodiment of the present invention will be described below with reference to the drawings.

Figure 1:
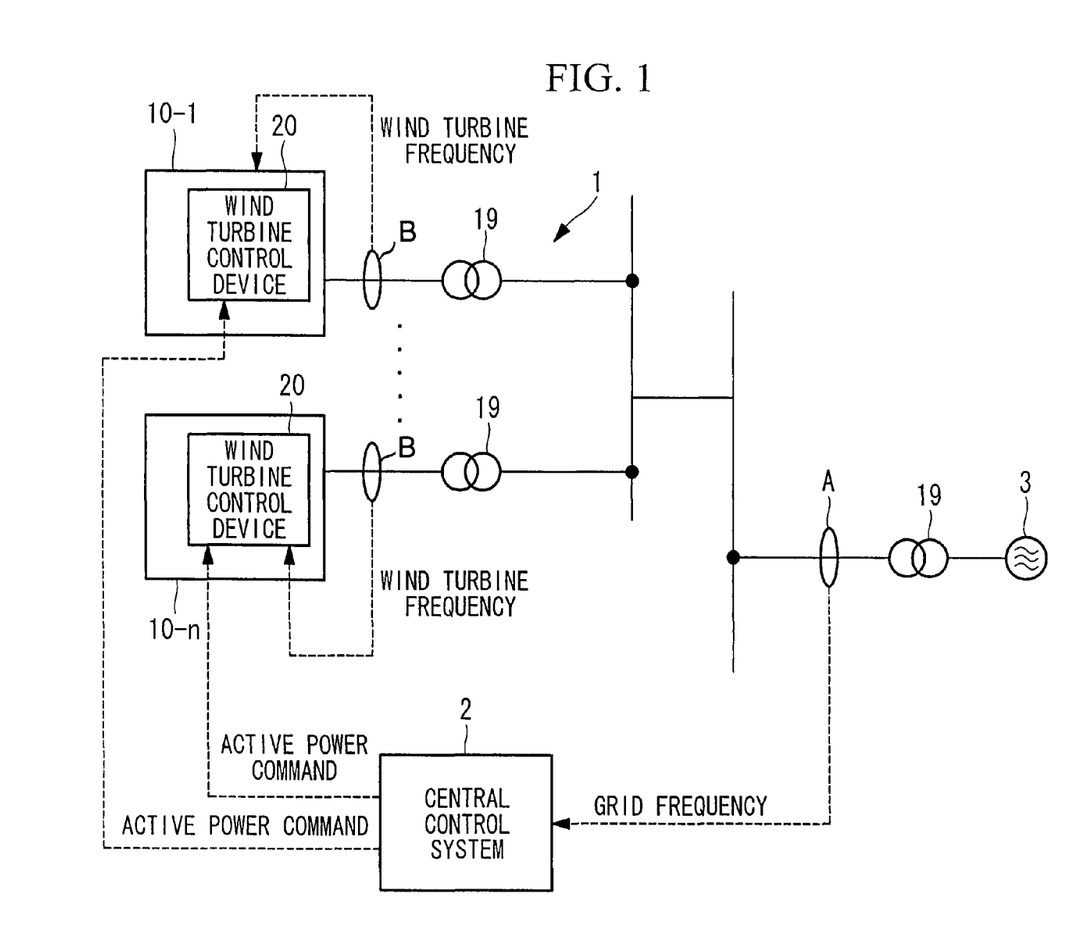
FIG. 1 is a diagram showing the entire configuration of a wind turbine generator system according to one embodiment of the present invention.

FIG. 1 is a diagram showing the entire configuration of the wind turbine generator system according to this embodiment. As shown in FIG. 1, a wind turbine generator system 1 includes a plurality of wind turbines 10-1, . . . , 10-n (hereinafter, reference numeral "10" is simply assigned to indicate the wind turbines as a whole, and reference symbols "10-1", "10-n", and the like are assigned to indicate individual wind turbines) and a central control system 2 that gives first correction values to the wind turbines 10.

In this embodiment, the wind turbines 10 are variable-speed wind turbines whose individual rotational speeds can be controlled according to the wind speed. Electrical power output from each of the wind turbines 10 is supplied to a utility grid 3 through a corresponding electrical power line via a common interconnection point A.

The grid frequency at the interconnection point A is measured by a frequency detection section 25 (see FIG. 5) and is output to the central control system 2.

The central control system 2 controls the output power at the interconnection point A, and, during the normal time, sets active power commands for the wind turbines, such that the output power at the interconnection point A matches the demand frequency and the demand electric-power value, which are notified, for example, from an electric power control room (for example, an electric power company) that controls electric power in the utility grid 3. The active power commands for the wind turbines set by the central control system 2 are sent to wind turbine control devices 20 provided in each of the wind turbines 10-1, . . . , 10-n. In each of the wind turbines, output power control is performed based on the corresponding active power command.

Figure 2:
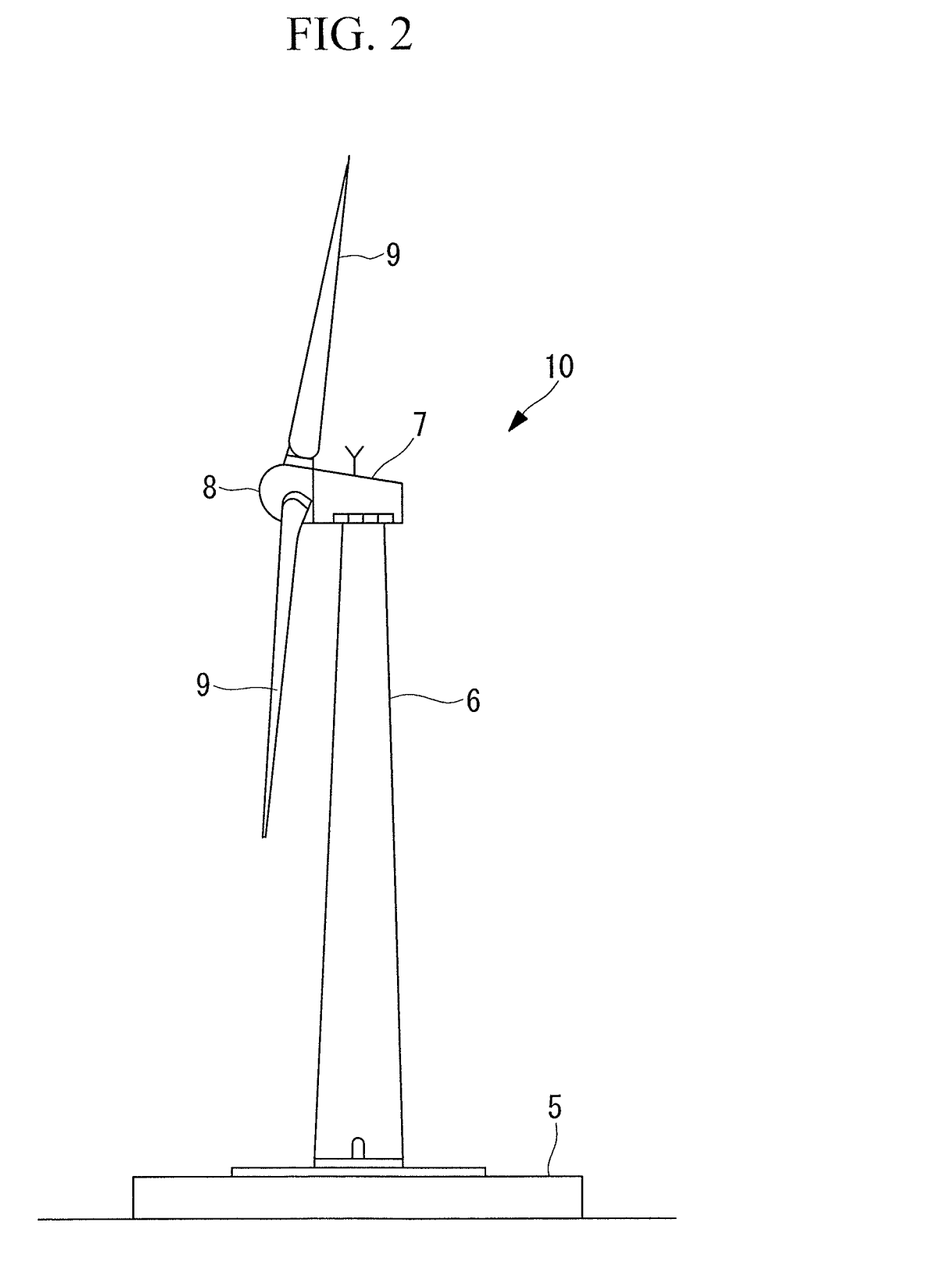
FIG. 2 is an outline view of a wind turbine shown in FIG. 1.
Figure 3:
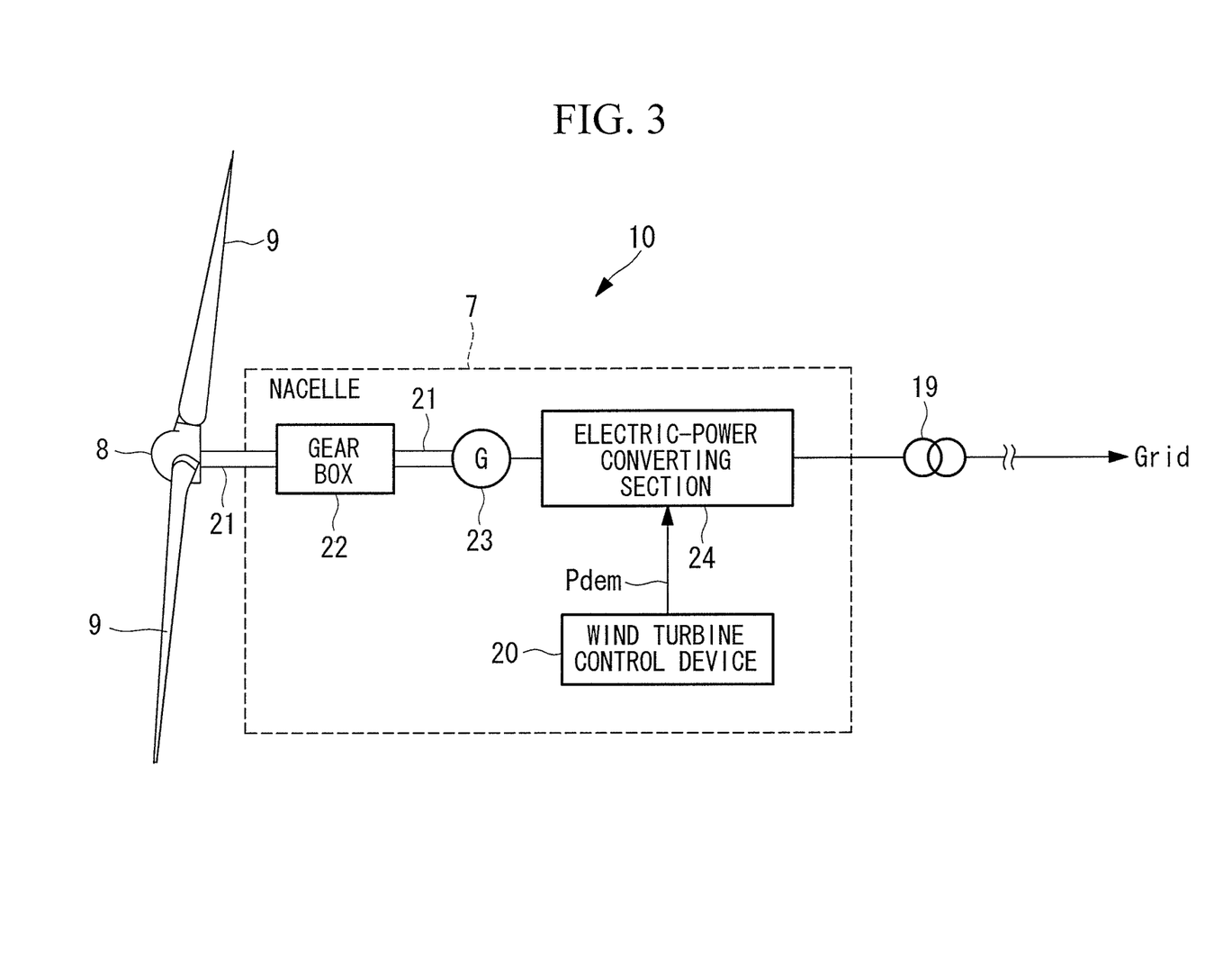
FIG. 3 is a schematic view showing, in outline, the electrical configuration of the wind turbine shown in FIG. 1.

FIG. 2 is an outline view of the wind turbine 10. FIG. 3 is a schematic view showing the electrical configuration of the wind turbine 10.

As shown in FIG. 2, the wind turbine 10 has a tower 6 provided upright on a foundation 5, a nacelle 7 provided on the top of the tower 6, and a rotor head 8 provided on the nacelle 7 so as to be capable of rotating about a substantially horizontal axis.

A plurality of blades 9 are attached to the rotor head 8 radially from the rotational axis of the rotor head 8. The blades 9 are coupled to the rotor head 8 so as to be capable of turning according to the operating conditions, and the pitch angles of the blades 9 can be changed.

As shown in FIG. 3, a gear box 22 and a generator 23 are mechanically coupled to a rotational shaft 21 of the rotor head 8. The generator 23 may be a synchronous generator or an induction generator. A configuration in which the gear box 22 is not provided can be used.

The force of wind striking the blades 9 from the direction of the rotational axis of the rotor head 8 causes the rotor head 8 to rotate about the rotational axis, and the rotative force is increased in speed by the gear box 22 and is transferred to the generator 23 to be converted to electrical power. Electrical power generated by the generator 23 is converted by an electric-power converting section 24 to electrical power for the utility grid 3 and is supplied to the utility grid 3 via a transformer 19.

The electric-power converting section 24 is controlled by the wind turbine control device 20. The wind turbine control device 20 has a function for controlling the output power of the generator 23 through the electric-power converting section 24, a function for controlling the pitch angles of the blades 9, and other functions.

Figure 4:
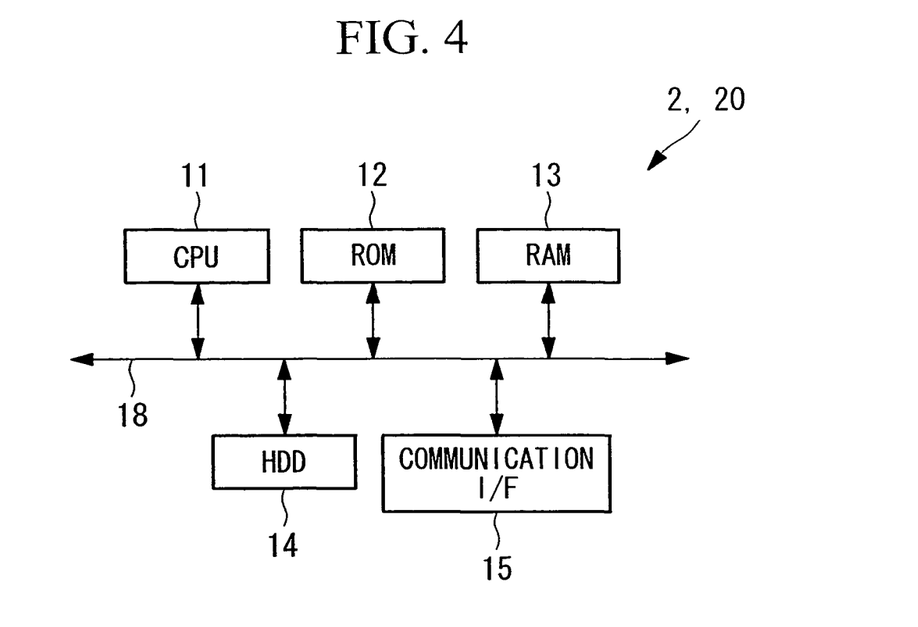
FIG. 4 is a diagram showing an example hardware configuration of a central control system shown in FIG. 1.

The central control system 2 and the wind turbine control devices 20 each has a computer. For example, as shown in FIG. 4, each of the central control system 2 and the wind turbine control devices 20 has a CPU 11, a ROM (read only memory) 12 for storing a program to be executed by the CPU 11, a RAM (random access memory) 13 that functions as a working area when the program is executed, a hard disk drive (HDD) 14 serving as a large-capacity storage unit, and a communication interface 15 for connecting to a communication network. These units are connected via a bus 18.

Furthermore, the central control system 2 may include an access unit to which an external storage device is attached, an input unit formed of a keyboard and a mouse, and a display unit formed of a liquid crystal display device that displays data.

The storage medium for storing the program executed by the CPU 11 is not limited to the ROM 12. For example, another auxiliary storage device, such as a magnetic disk, a magneto optical disk, and a semiconductor memory, may be used.

Figure 5:
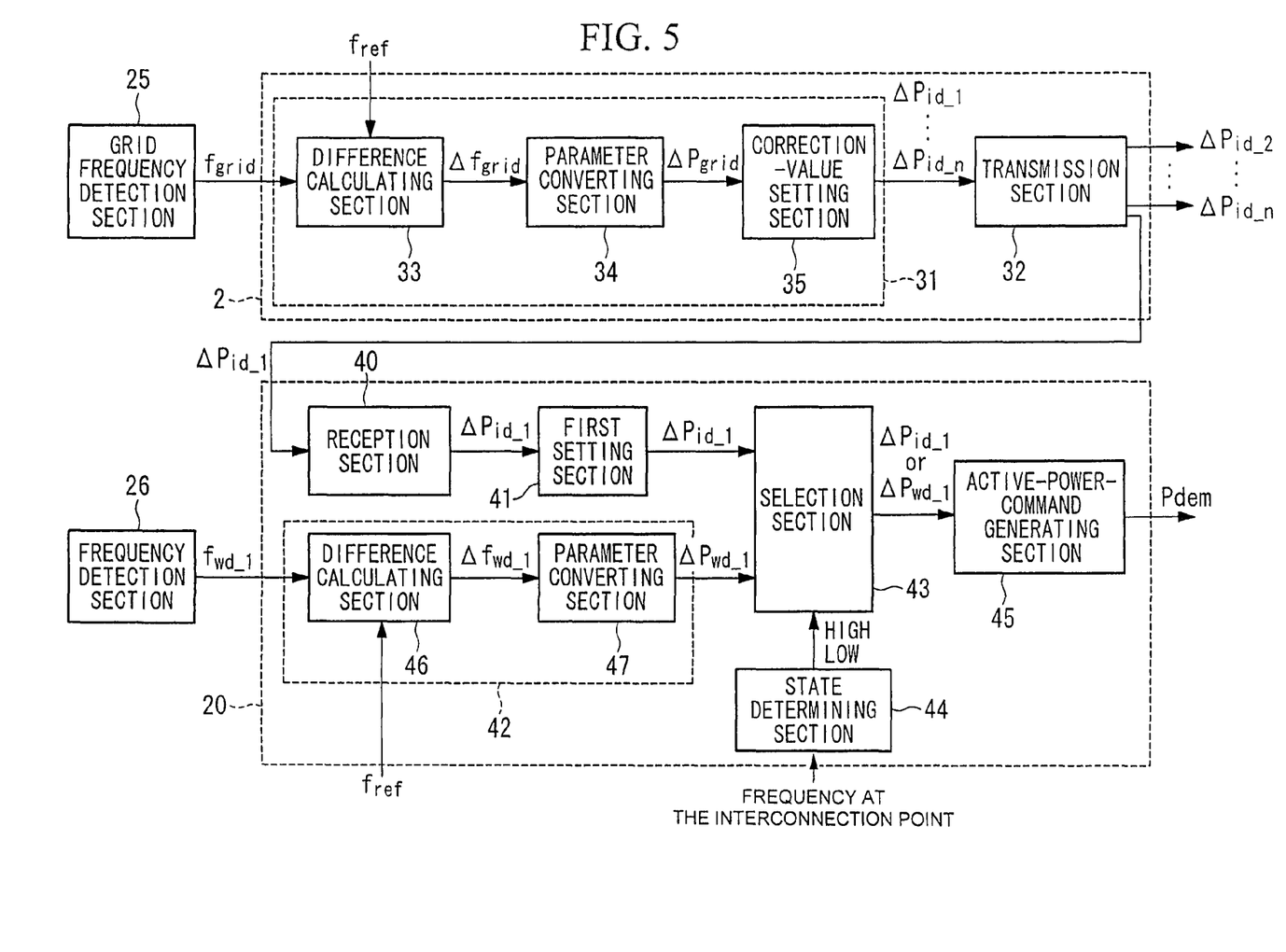
FIG. 5 is a functional block diagram mainly showing functions related to frequency reduction control among the functions of the central control system and a wind turbine control device shown in FIG. 1.

FIG. 5 is a functional block diagram mainly showing functions related to frequency control to be performed when a grid disturbance (fluctuation of a grid frequency) occurs, especially the functions of the central control system 2 and the wind turbine control device 20.

The central control system 2 generates, for the respective wind turbines, first command information for reducing fluctuation of a grid frequency at the interconnection point A and sends the generated first command information to the wind turbine control devices 20 of the wind turbines 10-1, . . . , 10-n.

For example, as shown in FIG. 5, the central control system 2 includes a first processing section 31 and a transmission section 32.

The first processing section 31 includes a difference calculating section 33, a parameter converting section 34, and a correction-value setting section 35.

The difference calculating section 33 calculates a grid frequency difference $\Delta f_{grid}$ that is the difference between the grid frequency detected by the frequency detection section 25 and the rated frequency notified from the electric power control room. Specifically, the grid frequency difference $f_{grid}$ is expressed by Formula (1).

$$\Delta f_{grid} = f_{ref} - f_{grid} \tag{1}$$

In Formula (1), $f_{ref}$ indicates the rated frequency, and $f_{grid}$ indicates the grid frequency.

The parameter converting section 34 has conversion information in which the relationship between a frequency difference $\Delta f$ and an electrical-power correction value $\Delta P$ is defined and, by using the conversion information, the parameter converting section 34 obtains a grid electrical-power correction value $\Delta P_{grid}$ corresponding to the grid frequency difference $\Delta f_{grid}$ calculated by the difference calculating section 33.

Figure 6:
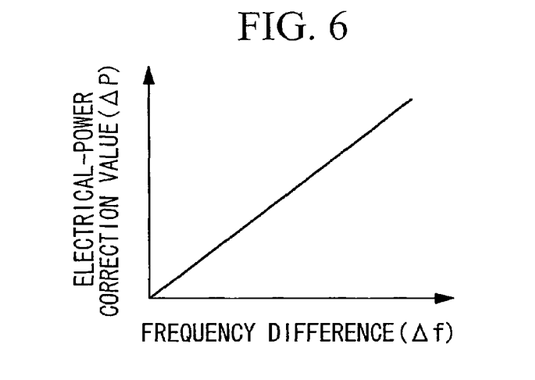
FIG. 6 is a diagram showing example conversion information.

FIG. 6 shows example conversion information. In FIG. 6, the horizontal axis indicates the frequency difference $\Delta f$, and the vertical axis indicates the electrical-power correction value $\Delta P$. Conversion characteristics shown in FIG. 6 can be desirably set according to the design of the wind turbine. Here, the gradient is defined as a positive linear function.

The grid electrical-power correction value $\Delta P_{grid}$ obtained by the parameter converting section 34 is output to the correction-value setting section 35. The correction-value setting section 35 divides the grid electrical-power correction value $\Delta P_{grid}$ by the number n of wind turbines that are being operated, thereby equally dividing the grid electrical-power correction value $\Delta P_{grid}$ for the wind turbines, and the correction-value setting section 35 sets first electrical-power correction values $\Delta P_{id\_1}, \ldots, \Delta P_{id\_n}$ for the wind turbines.

Weighting coefficients may be set in advance for the wind turbines 10-1, ..., 10-n, and the weighting coefficients may be used to determine the allocation of the grid electrical-power correction value $\Delta P_{grid}$ to the wind turbines that are being operated.

The thus-set first electrical-power correction values $\Delta P_{id\_1}, \ldots, \Delta P_{id\_n}$ for the wind turbines are sent to the wind turbine control devices 20 of the wind turbines, as the first command information.

Each of the wind turbine control devices 20 includes a reception section 40, a first setting section 41, a second processing section 42, a selection section 43, a state determining section 44, and an active-power-command generating section 45. Since the configurations of the wind turbine control devices 20 provided in the wind turbines 10-1, ..., 10-n are the same, the configuration of the wind turbine control device 20 of the wind turbine 10-1 will be described below as an example, for ease of explanation.

The reception section 40 receives the first electrical-power correction value $\Delta P_{id\_1}$ sent from the central control system 2 and outputs it to the first setting section 41. The first setting section 41 sets the first electrical-power correction value $\Delta P_{id\_1}$ received by the reception section 40 (Step SA 1 of FIG. 8). In this way, the first electrical-power correction value $\Delta P_{id\_1}$ set by the first setting section 41 serves as an electrical-power correction value for reducing fluctuation of the grid frequency.

The second processing section 42 sets second command information used to generate an output power command for reducing fluctuation of a frequency of the output power of the corresponding wind turbine 10-1. Specifically, the second processing section 42 includes a difference calculating section 46 and a parameter converting section 47.

The difference calculating section 46 receives the frequency of the output power of the wind turbine 10-1 detected by a frequency detection section 26 at a detection point B (hereinafter, referred to as "wind-turbine frequency"). The difference calculating section 46 calculates a wind-turbine frequency difference $\Delta f_{wd\_1}$ between the received wind-turbine frequency and the above-described rated frequency. Specifically, the wind-turbine frequency difference $\Delta f_{wd\_1}$ is expressed by Formula (2).

$$\Delta f_{wd\_1} = f_{ref} - f_{wd\_1} \quad (2)$$

In Formula (2), $f_{ref}$ indicates the rated frequency, and $f_{wd\_1}$ indicates the wind-turbine frequency of the wind turbine 10-1.

The parameter converting section 47 has the conversion information shown, for example, in FIG. 6. The parameter converting section 47 uses the conversion information to obtain a wind-turbine electrical-power correction value $\Delta P_{wd\_1}$ corresponding to the wind-turbine frequency difference $\Delta f_{wd\_1}$ calculated by the difference calculating section 46; and the parameter converting section 47 sets the wind-turbine electrical-power correction value $\Delta P_{wd\_1}$ as a second electrical-power correction value (second command information) (Step SA 2 of FIG. 8).

The selection section 43 receives the first electrical-power correction value set by the first setting section 41 and the second electrical-power correction value set by the second processing section 42. During a grid disturbance, the selection section 43 selects the second electrical-power correction value at an early stage of the grid disturbance, and selects the first electrical-power correction value at a late stage of the grid disturbance, and the selection section 43 outputs the selected electrical-power correction value to the active-power-command generating section 45 (Step SA 3 of FIG. 8). Whether a grid disturbance occurs, whether it is in the early stage of the grid-disturbance, and whether it is in the late stage of the grid disturbance are determined by input signals output from the state determining section 44.

The state determining section 44 detects a grid disturbance when a frequency change at the interconnection point A exceeds a predetermined first threshold and outputs a high signal to the selection section 43. Furthermore, when the grid frequency becomes smaller than a second threshold, the second threshold being equal to or smaller than the first threshold, for a predetermined period of time, the state determining section 44 determines that it is in the late stage and switches the output signal from the high signal to a low signal.

The selection section 43 selects the second electrical-power correction value $\Delta P_{wd\_1}$ while the high signal is received from the state determining section 44. Furthermore, the selection section 43 selects the first electrical-power correction value $\Delta P_{id\_1}$ while the low signal is received from the state determining section 44. The selection section 43 outputs the selected electrical-power correction value to the active-power-command generating section 45.

Figure 8:
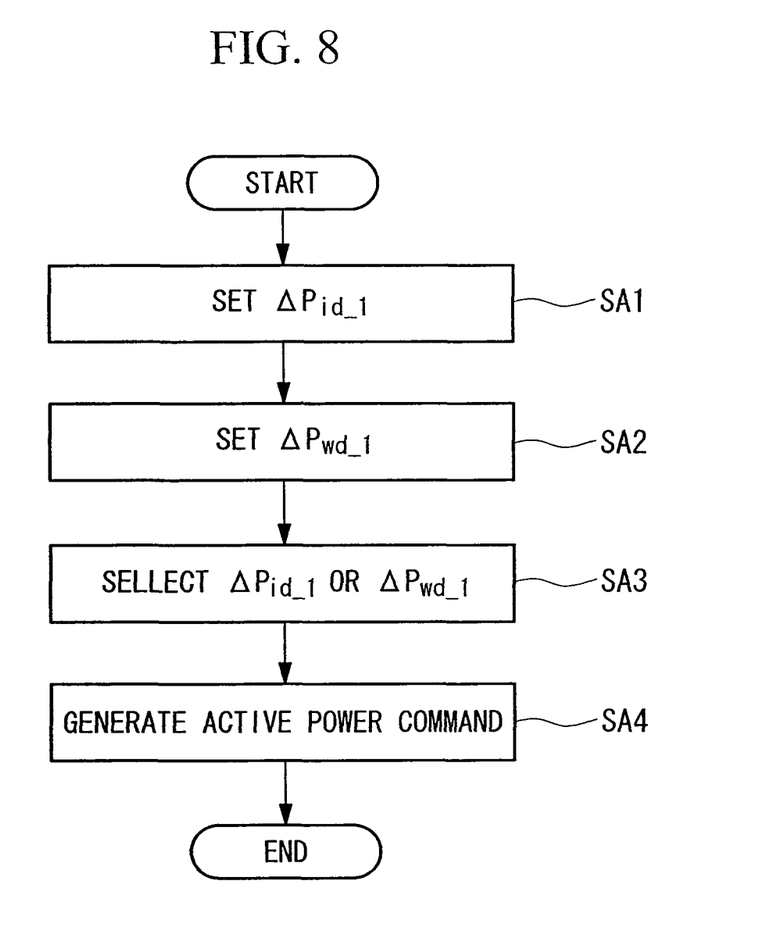
FIG. 8 is a flowchart showing a procedure of a control method for the wind turbine control device according to one embodiment of the present invention.

The active-power-command generating section 45 holds a reference active power command serving as the reference, for example, and adds the first electrical-power correction value or the second electrical-power correction value received from the selection section 43 to the reference active power command, for generating an active power command (Step SA 4 of FIG. 8). Furthermore, the active-power-command generating section 45 generates a control signal Pdem for controlling the electric-power converting section 24 based on this active power command and outputs the control signal Pdem to the electric-power converting section 24.

The above-described reference active power command may be a fixed value or a value to be sequentially calculated by performing a predetermined calculation by using the current output power of the generator 23, the rotational speed of the rotor head 8, the pitch angles of the blades 9, and the wind speed.

In the wind turbine generator system having the above-described configuration, the first electrical-power correction values for matching the grid frequency with the rated frequency are set by the central control system 2 at predetermined time intervals and are sent to the wind turbine control devices 20 of the wind turbines.

In each of the wind turbine control devices 20, the corresponding first electrical-power correction value sent from the central control system 2 is received by the reception section 40 and is set by the first setting section 41. Furthermore, the second electrical-power correction value for matching the frequency of the output power of the corresponding wind turbine with the rated frequency is set by the second processing section 42.

Figure 7:
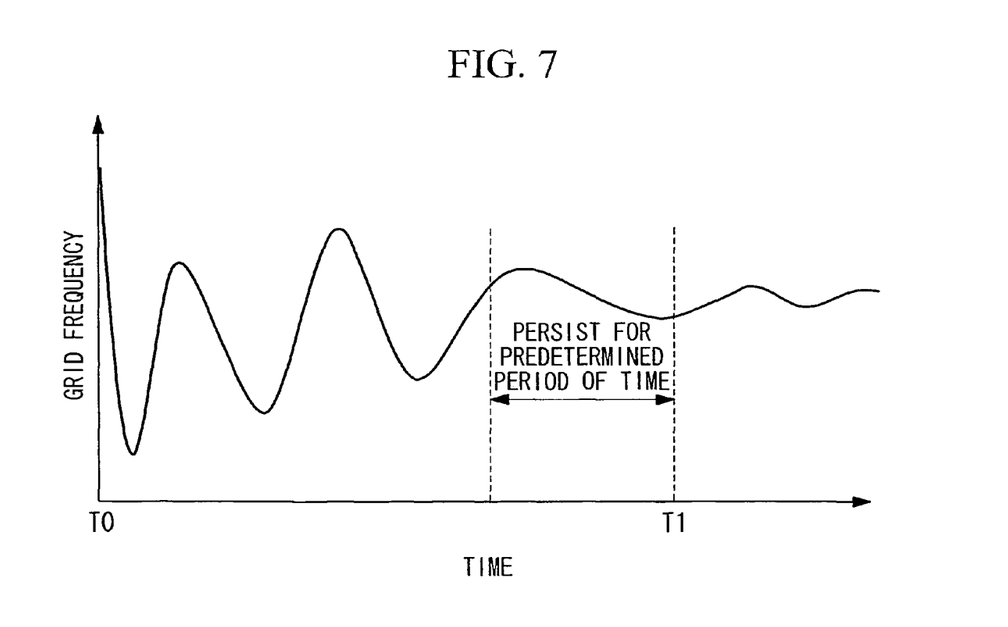
FIG. 7 is a diagram for explaining an early stage and a late stage of a grid disturbance.

In the state determining section 44, as shown in FIG. 7, for example, when a grid disturbance occurs, it is detected at Time T0, and a high signal is output. Then, after the elapse of time, at Time T1 in FIG. 7, when it is determined that the fluctuation of the grid frequency at the interconnection point A becomes smaller than the second threshold for the predetermined period of time, the output signal is switched from the high signal to the low signal.

Thus, in the selection section 43, the second electrical-power correction value is selected during the early stage when the grid disturbance occurs (during the period of time from Time T0 to T1 in FIG. 7), and the first electrical-power correction value is selected during the late stage of the grid disturbance (after Time T1 in FIG. 7). Therefore, during the early stage of the grid disturbance, the active-power-command generating section 45 generates an active power command by using the second electrical-power correction value for reducing the fluctuation of the wind-turbine frequency, and the output power of the wind turbine is controlled based on this active power command. Furthermore, during the late stage of the grid disturbance, the active-power-command generating section 45 generates an active power command by using the first electrical-power correction value for reducing the fluctuation of the grid frequency, and the output power of the wind turbine is controlled based on this active power command.

As described above, according to the wind turbine control device 20, the method therefor, and the wind turbine generator system 1 of this embodiment, when a grid disturbance occurs, during the early stage of the grid disturbance, output power control for reducing the fluctuation of the frequency of the output power of each wind turbine is performed in each wind turbine; and, during the late stage of the grid disturbance, output power control for reducing the fluctuation of the grid frequency at the interconnection point A is performed in each wind turbine.

The control for reducing the fluctuation of the frequency of the output power of each wind turbine has higher responsiveness than the control for reducing the fluctuation of the grid frequency. Therefore, the control for reducing the fluctuation of the frequency of the output power of each wind turbine is selected during the early stage of the grid disturbance, thereby it is possible to effectively reduce the fluctuation of the grid frequency at the interconnection point A.

In this embodiment, when the fluctuation of the grid frequency at the interconnection point A becomes smaller than the second threshold for the predetermined period of time, it is determined that the grid disturbance is in the late stage. However, instead of this, for example, it may be determined that the grid disturbance is in the late stage when the fluctuation of the grid frequency at the interconnection point A lasts for a predetermined third threshold. Furthermore, it may be determined that the grid disturbance is in the late stage when the state determining section 44 has these two conditions, and one of the conditions is satisfied.

In this embodiment, whether a grid disturbance occurs and whether it is in the early stage or the late stage are determined based on the grid frequency. Instead of this, however, whether a grid disturbance occurs and whether it is in the early stage or the late stage may be determined by using the frequency of the output power of each wind turbine.

In this embodiment, the first command information and the second command information set by the first setting section and the second processing section, respectively, are used as electrical-power correction values. Instead of this, however, a first active power command in which the first electrical-power correction value is reflected and a second active power command in which the second electrical-power correction value is reflected may be set as the first command information and the second command information, respectively.

In this case, it is just necessary to provide the active-power-command generating section 45 between the first setting section 41 and the selection section 43 and between the parameter converting section 47 and the selection section 43, for example. Furthermore, in this case, the central control system 2 may generate first active power commands for the wind turbines so as to reduce the fluctuation of the grid frequency at the interconnection point A and may send the generated first active power commands to the wind turbines 10. In this case, the first setting section 41 sets the corresponding first active power command received from the central control system 2.

REFERENCE SIGNS LIST 1 wind turbine generator system
2 central control system
3 utility grid
10-1, 10-$n$ wind turbines
20 wind turbine control device
25, 26 frequency detection sections
31 first processing section
32 transmission section
33 difference calculating section
34 parameter converting section
35 correction-value setting section
40 reception section
41 first setting section
42 second processing section
43 selection section
44 state determining section
45 active-power-command generating section
46 difference calculating section
47 parameter converting section
A interconnection point
B detection point

The invention claimed is:

1. A wind turbine control device applied to a wind turbine generator system in which output powers of a plurality of wind turbines are supplied to a utility grid through a common interconnection point, the wind turbine control device being provided in each of the plurality of wind turbines, the wind turbine control device comprising:
a setting section for generating first command information used to generate a first output power command for reducing fluctuation of a frequency of an output power of one wind turbine when a grid disturbance occurs, to thereby reduce fluctuation of a grid frequency at the interconnection point;
a processing section for generating second command information used to generate a second output power command for reducing fluctuation of the frequency of the output power of the one wind turbine when the grid disturbance occurs;
a selection section for selecting the first command information or the second command information when the grid disturbance occurs, the second command information being selected when the fluctuation of the grid frequency at the interconnection point exceeds a predetermined first threshold and the first command information being selected when the fluctuation of the grid frequency at the interconnection point becomes smaller than a second threshold, the second threshold being equal to or smaller than the first threshold, for a predetermined period of time or when a cycle of the fluctuation of the grid frequency at the interconnection point lasts for a predetermined third threshold; and a command generating section for generating the first output power command or the second output power command for controlling the output power of the one wind turbine based on the first command information or the second command information selected by the selection section.

2. A wind turbine control device according to claim 1, wherein the setting section is configured to obtain the first command information corresponding to the fluctuation of the grid frequency at the interconnection point based on conversion information defined in advance.

3. A wind turbine control device according to claim 1, wherein the processing section is configured to obtain the second command information corresponding to the fluctuation of the frequency of the output power of the one wind turbine based on conversion information defined in advance.

4. A wind turbine control device according to claim 1, further comprising a central control system for controlling an output power at the interconnection point and transmitting the first command information,
wherein the setting section receives the first command information from the central control system.

5. A control method for each of a plurality of wind turbines, the method being applied to a wind turbine generator system in which output powers of the plurality of wind turbines are supplied to a utility grid through a common interconnection point, the method comprising:

a setting step of generating first command information used to generate a first output power command for reducing fluctuation of a frequency of an output power of one wind turbine when a grid disturbance occurs, to thereby reduce fluctuation of a grid frequency at the interconnection point;

a processing step of generating second command information used to generate a second output power command for reducing fluctuation of the frequency of the output power of the one wind turbine when the grid disturbance occurs;

a selecting step of selecting the first command information or the second command information when the grid disturbance occurs, the second command information being selected when the fluctuation of the grid frequency at the interconnection point exceeds a predetermined first threshold and the first command information being selected when the fluctuation of the grid frequency at the interconnection point becomes smaller than a second threshold, the second threshold being equal to or smaller than the first threshold, for a predetermined period of time or when a cycle of the fluctuation of the grid frequency at the interconnection point lasts for a predetermined third threshold; and a command generating step of generating the first output power command or the second output power command for controlling the output power of the one wind turbine based on the first command information or the second command information selected in the selecting step.

6. A wind turbine generator system equipped with a plurality of wind turbines, in which output powers of the plurality of wind turbines are supplied to a utility grid through a common interconnection point, the wind turbine generator system comprising:

a central control system for controlling an output power at the interconnection point; and a plurality of wind turbine control devices each of which is provided in each of the plurality of wind turbines, for controlling an output power of each of the plurality of wind turbines, wherein the central control system comprises:

a first processing section for generating first command information used to generate a first output power command for reducing fluctuation of a grid frequency at the interconnection point when a grid disturbance occurs; and a transmission section for sending the first command information for the plurality of wind turbines generated by the first processing section to the plurality of wind turbines, wherein each of the plurality of wind turbine control devices comprises:

a reception section for receiving the first command information from the central control system;

a setting section for transmitting the first command information;

a second processing section for generating second command information used to generate a second output power command for reducing fluctuation of a frequency of the output power of one wind turbine when the grid disturbance occurs;

a selection section for selecting the first command information or the second command information when the grid disturbance occurs, the second command information being selected when the fluctuation of the grid frequency at the interconnection point exceeds a predetermined first threshold and the first command information being selected when the fluctuation of the grid frequency at the interconnection point becomes smaller than a second threshold, the second threshold being equal to or smaller than the first threshold, for a predetermined period of time or when a cycle of the fluctuation of the grid frequency at the interconnection point lasts for a predetermined third threshold; and a command generating section for generating the first output power command or the second output power command for controlling the output power of the one wind turbine based on the first command information or the second command information selected by the selection section.

7. The wind turbine generator system according to claim 6, further comprising a detecting section detecting the transition, wherein the detecting section outputs a first signal to the selecting section to select the second command information, and the detecting section outputs a second signal to the selecting section to select the first command information.

* * * * *